Patented Feb. 11, 1947

2,415,541

UNITED STATES PATENT OFFICE 2,415,541

HIGH-BOILING AROMATIC OIL

Frank J. Soday, Baton Rouge, La., assignor to The United Gas Improvement Company, a corporation of Pennsylvania No Drawing. Application February 19, 1944, Serial No. 523,116

7 Claims. (Cl. 260—668)

This invention relates to new compositions of matter comprising certain high boiling aromatic oils.

More particularly, this invention is concerned with the provision of a high-boiling aromatic oil separated from tar formed during the production of combustible gas by processes involving the pyrolytic decomposition of petroleum oil with or without the aid of catalysts, the said oil being free from certain dissolved crystalline, waxy, and/or solid materials under certain reduced temperature conditions.

Another object of the invention is the provision of natural and/or synthetic rubber compositions and particularly synthetic rubber compositions suitable for use as tire or tube stocks; for molding purposes; for the fabrication of printer's rolls, hose, sheets, tubes, and other objects and specialties; for the preparation of adhesives and cements, and for coating, impregnating, waterproofing, and other specialized uses; comprising rubber, and particularly one or more synthetic rubbers or elastomers, and a high-boiling aromatic oil separated from tar formed during the production of combustible gas by processes involving the pyrolytic decomposition of petroleum oil with or without the aid of catalysts, the said oil being free from certain solid and/or crystalline materials under certain reduced temperature conditions, with or without the incorporation of other additives selected from a list comprising sulfur, accelerators, pigments, resins, antioxidants, fillers, extenders, and/or other plasticizing and/or softening agents, such as stearic acid, pine oil, and pine tar. Another object of the invention is the use of such refined high boiling aromatic oils in conjunction with other ingredients, such as resins, resinous materials, plastic products, and dibutyl phthalate or other high-boiling compounds as softening and/or plasticizing oils for synthetic rubber. Other objects and advantages of the invention will be apparent to those familiar with the art upon an inspection of the specification and claims.

A considerable proportion of the softening and/or plasticizing agents employed in synthetic rubber compounds, at the present time suffer from many disadvantages, chief among which is their lack of compatibility with synthetic rubber. This lack of compatibility renders it extremely difficult to obtain a uniform mixture or dispersion of the softener in the rubber compound, resulting in the production of non-uniform objects or products. In addition, the use of such softening agents frequently results in the leafing or lamination of the rubber compound during the mastication or calendering process. Finally, the incorporation of such incompatible softeners in rubber compounds results in the production of finished objects which frequently exhibit bleeding or blooming during use.

I have discovered that the aromatic hydrocarbon oil boiling mainly above 210° C. and separated from tar produced during the production of gas by a process involving the pyrolytic decomposition of petroleum oil with or without the aid of catalysts may be treated, when necessary, to remove certain crystalline, solid, and/or waxy materials dissolved therein, to obtain crystallizing or solid forming points below 20° C. and more particularly below 10° C., such as below 0° C., −10° C., −20° C., −30° C., −40° C., or even lower, largely widening the field of utilization of the said oils.

I have discovered further that such oils are unusually well adapted for use as plasticizing, softening and tackifying agents for synthetic rubbers and/or elastomers, particularly when such materials are to be used subsequently at low temperatures.

Such high-boiling aromatic oils are preferred, which have a preponderant portion boiling above approximately 250° C.; still more preferred are those having a preponderant portion boiling above approximately 275° C.; even more preferred are those having a preponderant portion boiling above approximately 300° C.; and especially preferred are those having a preponderant portion boiling above approximately 325° C. For certain purposes, it may be preferred to employ high-boiling aromatic oils of this type which boil substantially within certain ranges, for example, between 225 and 450° C., more preferably between 300 and 450° C., and still more preferably between 325 and 450° C., though for other purposes relatively narrow cuts confined to the lower boiling ranges may be preferred.

The excellent results obtained when such aromatic oils are used as plasticizing and/or softening agents for synthetic rubber are due largely to the exceptional solubility characteristics of such oils, and their excellent compatibility with synthetic rubbers and elastomers. This largely increases the throughput on a given mill, and results in a very substantial saving in power. The use of such oils in synthetic rubber compounding results in the production of uniform compounds and finished articles remarkably free from bleeding, blooming, leafing, or lamination.

In addition, the exceptionally low viscosity characteristics of aromatic oils of the type described greatly assists in the blending and milling operations, and insures rapid and complete penetration. Uniform stocks possessing good calendering and milling characteristics are thus obtained.

Aromatic oils of the type described are exceptionally stable, and are strongly resistant to decomposition, thus insuring the production of uniform compounds and finished articles free from decomposition products. Such compounds, and the finished articles prepared therefrom, possess very good aging characteristics.

Aromatic oils of the type described herein are extracted and/or distilled products, consequently they contain very little, if any, free carbon or other extraneous materials. This is of considerable importance from the standpoint of the preparation of clean, uniform rubber compounds and finished articles, and from the standpoint of smooth, trouble-free mill operation.

It has been discovered that very considerable quantities of high-boiling aromatic oils of the type described are contained in the tar produced in the vapor phase pyrolysis of crude petroleum oil or a fraction or fractions thereof such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and at about atmospheric pressure and also particularly so when the oil pyrolyzed is naphthenic, such as a crude oil classifiable in classes 5 to 7 inclusive, according to the method of classification described in Bureau of Mines Report of Investigations 3279, or a fraction or fractions of such an oil. However, petroleum oils of other classes than 5 to 7 inclusive may be employed.

Recently, methods have been developed for the recovery of unusually large quantities of aromatic hydrocarbon boiling in the ranges set forth, from petroleum oil gas tar, produced in the manufacture of gas, such for example, as carburetted water gas, oil gas, or the like. These methods recover high-boiling aromatic oils which are unique in character. The usual distillation procedures employed for the purpose of petroleum tar dehydration and fractionation have been such as to polymerize the readily heat polymerizable monomers boiling above 210° C., which are frequently present in large proportions, into heavy polymers, which became inextricably mixed with the heavy black pitch constituents and with the higher-boiling non-heat polymerizable aromatic oils present. As a result, the high-boiling non-heat polymerizable aromatic oils were retained by the residual tar or pitch.

In copending application Serial Number 370,608, filed December 18, 1940, by Edwin L. Hall and Howard R. Batchelder, which has matured into Patent 2,387,259, granted October 23, 1945, the high-boiling aromatic hydrocarbon oils containing heat polymerizable monomeric aromatic hydrocarbons boiling above 210° C. and separated from the heavy black pitch constituents of the petroleum tar are described and claimed, together with heat polymers produced from said polymerizable oils.

In copending application 386,232, filed April 1, 1941, by Waldo C. Ault, which has matured into Patent 2,387,237, granted October 23, 1945, there is described and claimed the production of catalytic resins from the heat polymerizable and/or catalytically polymerizable monomeric hydrocarbons boiling above 210° C. and separated in monomeric form from the heavy black pitch constituents of the petroleum tar.

The high-boiling non-heat polymerizable aromatic oils of the type described may be isolated from the resins obtained from each of these processes.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940 by Edwin L. Hall and Howard R. Batchelder, which has matured into Patent 2,366,899, granted January 9, 1945, there is described a method of dehydrating such petroleum tar emulsions and of fractionating the hydrocarbon constituents thereof by rapid distillation with the separation from the heavy pitch constituents of residual tar of a mixture of non-heat polymerizable aromatic hydrocarbons and heat polymerizable unsaturated monomeric aromatic hydrocarbons boiling above 210° C.

In copending application 353,034, filed August 17, 1940, by Howard R. Batchelder, which has matured into Patent 2,383,362, granted August 21, 1945, there is described the dehydration of such petroleum tar emulsions and the fractionation of the hydrocarbon constituents thereof with the recovery of monomeric unsaturated heat polymerizable hydrocarbon constituents and high-boiling non-heat polymerizable aromatic oils separate from the heavy black pitch constituents of residual tar, by the solvent extraction of the emulsion with a hydrocarbon solvent such as liquefied propane or butane.

Other processes, for example fractional condensation, might be employed to recover these high-boiling aromatic hydrocarbons separate from the heavy black pitch constituents of the tar. Also processes for oil pyrolysis which avoid the formation of emulsions, may be employed for the production of the high-boiling aromatic hydrocarbons. Furthermore, while it may be preferred to employ petroleum oils or cuts therefrom, which are classifiable in classes 5 to 7 inclusive according to Bureau of Mines Report of Investigations 3279, and particularly in class 7, other oils may be employed.

As a result of separation of the light oil and higher-boiling aromatic oil components of the products of such petroleum oil pyrolysis from the residual tar, without polymerization or with materially reduced polymerization, a substantially pitch-free highly aromatic hydrocarbon material may be separated having a portion boiling within the range of from 210 to 400° C., or higher, which may contain from 5% to 30%, and higher, of monomeric unsaturated aromatic hydrocarbons readily polymerizable by heat.

As previously stated, the above mentioned heat polymerizable highly aromatic monomeric material may be readily polymerized by heat to form resins, after which the high-boiling non-heat polymerizable aromatic hydrocarbons may be separated from such resins by any desired method, such as by distillation, which may be assisted by steam and carried out under reduced pressures.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin. The higher-boiling non-heat polymerizable aromatic oils then may be separated by fractional distillation.

It may be preferable, however, to first effect a separation by fractional distillation between light oil boiling below say 210° C. and oils boiling above say 210° C.

The polymerization of the heat polymerizable unsaturated monomeric material in the separated aromatic oils boiling above, say 210° C., may be effected by heating the oil with stirring, for example, for four hours at 200° C.

The resin thus produced, together with any resin produced during the separation of the light oil from the higher-boiling oil, may then be removed by distillation under vacuum.

As hereinbefore stated, after polymerization the high-boiling non-heat polymerizable aromatic oils may be isolated from the resin by distillation in vacuum, which may be assisted by steam, or otherwise.

The high-boiling material derived from tar obtained in the pyrolysis of petroleum, by rapid distillation or solvent extraction methods or otherwise also may be subjected to polymerization prior to the separation of the desired high-boiling non-heat polymerizable aromatic oils by the application of certain catalysts, either with or without the simultaneous, or otherwise, application of heat, for example as described and claimed in the above copending application, Serial No. 386,232, filed April 1, 1941, by Waldo C. Ault.

Catalysts such as mineral acids, for example, sulfuric acid, hydrogen chloride, acids of phosphorus, or acid-acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

While high-boiling oils of the type described may be isolated from the tar emulsion by either distillation or solvent extraction methods, as pointed out previously, I prefer to employ high-boiling oils which have been isolated by solvent extraction methods because of the presence therein of very much larger proportions of high-boiling aromatic oils of the type described. The flash-distillation method of isolating such oils from the tar emulsion may permit the polymerization of a portion of the unsaturated materials to take place, though very greatly less than in conventional methods, thus increasing the quantity of resinous and/or pitch-like materials left behind in the tar. The presence of these polymers in the tar effectively reduces the quantity of the aromatic oils recovered, and particularly those having the higher high-boiling range.

While aromatic oils boiling above 210° C. may be produced by conventional methods of distillation of the products of vapor phase oil pyrolysis produced in the manufacture of gas, and may be employed in accordance with the present invention, such aromatic oils are by no means as preferred for this purpose, as are the high-boiling aromatic oils produced by the use of separation methods, which minimize polymerization of the high-boiling heat polymerizable unsaturates.

In conventional distillation methods, the tars are subjected to elevated temperatures for such lengths of time as to polymerize the far greater part, if not all, of the high-boiling heat polymerizable unsaturates. This results in the production of a very highly viscous mass, from which the removal of the higher-boiling non-heat polymerizable aromatic constituents by commercially feasible methods is precluded by very great operating difficulties.

The processes, which minimize or avoid polymerization in the separation of the high-boiling aromatic oil from the tar, thus produce high-boiling aromatic oils which differ from those produced by conventional processes not only in their content of high-boiling heat polymerizable unsaturates, but also in their content of the higher-boiling non-heat polymerizable aromatic constituents. The high-boiling aromatic oils produced by these methods are therefore unique.

In connection with the isolation of these high-boiling aromatic oils by the preferred method, namely, by the solvent extraction of the tar emulsion, it should be emphasized that the mixture of saturated aromatic oils and unsaturated aromatic oils obtained by such methods may be fractionally distilled prior to, during, or after polymerization to isolate the aromatic oils having the desired high-boiling range. Separation by distillation prior to polymerization may be preferred in certain cases for reasons more particularly set forth in said copending applications.

Thus, the extracted oils may be distilled prior to polymerization to give a fraction boiling above, say for example 275–300° C., and a lower boiling fraction. These may be polymerized separately, after which the non-polymerized high-boiling aromatic oils of the type desired may be isolated from the resinous materials obtained, preferably from the higher-boiling fraction.

The process may be further illustrated by the following examples.

*Example 1*

Petroleum oil gas tar emulsion obtained by the pyrolysis of a Bureau of Mines type 7 naphthenic oil in the presence of steam in a ceramic chamber at temperatures above 1300° F. and substantially atmospheric pressure is extracted with liquid propane. After removal of the propane, the extracted oil is flash-distilled to give a fraction boiling almost entirely above 250° C.

This fraction is polymerized by heating to a temperature of 200° C. for a period of 4 hours after which the non-polymerized aromatic oils are isolated by distillation until a vapor temperature of approximately 200° C., or higher, is reached at a pressure of approximately 20 mm. of mercury absolute.

*Example 2*

A sample of extracted and distilled oil similar to that employed in Example 1 is polymerized by the addition of 96% sulfuric acid in small portions at temperatures below 50° C. until no further temperature rise is noted. The addition of 1% by weight of acid usually is sufficient to insure complete polymerization.

The acid sludge layer then is removed, either with or without the addition of naphtha to reduce the viscosity of the mixture, and the polymerized material washed and neutralized. The non-polymerized high-boiling aromatic oils then are isolated by distillation under reduced pressure.

Example 3

A sample of extracted and distilled oil similar to that employed in Example 1 is polymerized by the addition of 3% by weight of aluminum chloride-diethyl ether complex at temperatures below 50° C. After the polymerization has been completed, the catalyst is neutralized by the addition of an aqueous alkaline solution. Clay or other desired filter aid then is added and the mass filtered. The filtered material is distilled under reduced pressures to isolate the non-polymerized high-boiling aromatic oils.

Any combination of the foregoing methods may, of course, be employed to isolate the non-polymerized high-boiling aromatic oils.

The oils obtained may if desired, be further treated.

Thus, the high-boiling aromatic oils may be washed with one or more portions of sulfuric acid, preferably of 96% concentration, until all, or substantially all, of the colored bodies are removed. The oil then may be contacted with clay or other surface-active agents, if desired, to remove any remaining impurities. Oils ranging in color from a light yellow to water white are readily obtained in this manner, the exact color of the oil obtained depending, among other things, upon the severity of the treating operation employed.

Other treating methods may, of course, be employed if desired, either alone or in conjunction with acid washing, or otherwise. Thus, the high-boiling aromatic oils may be contacted with, or percolated through, activated clay or other surface active agent.

As pointed out previously, I have discovered that such high boiling aromatic oils may be refined when necessary, by the use of methods designed to remove crystalline, solid, and/or waxy compounds or bodies therefrom, largely widening their field of usefulness. As an example, such treated oils are particularly desirable for use in synthetic rubber compositions.

A suitable method for removing such bodies comprises reducing the temperature of the said high boiling aromatic oil until solid materials separate therefrom. The mixture then may be decanted, filtered, or otherwise treated to separate the solid phase from the liquid.

The process may be repeated any desired number of times, the oil obtained in each cycle having a lower crystalline point than the oil obtained from the preceding refining cycle. In this manner, a high-boiling aromatic oil having any desired low crystalline point may be obtained at will.

The crystallizing temperature initially employed may be varied somewhat, although I generally prefer to employ temperatures below 20° C., and more particularly below 10° C. Succeeding crystallizing operations normally are carried out at lower temperatures, such as temperatures below 0° C., −20° C., −40° C., and even lower.

The crystallizing point of the oil obtained from such operation, or operations, will vary with the crystallizing temperature employed, as well as with the number of successive treating operations employed. High boiling aromatic oils having crystallizing points of 0° C., −20° C., −40° C., and even lower, may be obtained by this process.

If desired, the high boiling aromatic oil may be diluted with one or more solvents prior to treatment to reduce the viscosity of the mixture and facilitate handling. Examples of suitable solvents to use for this purpose include aliphatic hydrocarbons, such as petroleum ether, propane, butane, pentane, hexane, heptane, and gasoline; and aromatic solvents such as benzene, toluene, and xylene. After the refining operations have been completed, such solvents may be removed from the high-boiling aromatic oil by distillation.

The solid phase may be separated from the liquid phase by any desired method. Thus, the separation may be carried out by decantation, filtration, and similar methods. Any desired filtering unit may be employed, although I generally prefer to use a centrifuge or super centrifuge. A semicontinuous super centrifuge, with intermittent removal of filter cake, will be found to be very suitable.

The high boiling aromatic oil preferably should be agitated vigorously during the cooling process in order to keep the solid material in suspension. A cylindrical cooling unit provided with scraping-type agitation blades, such as those employed commercially in ice cream freezers, ice cream blenders, margarine chillers, and the like, is particularly well adapted for use in the process.

Filter aids may be added to the high boiling aromatic oil prior to, during, or after the cooling operation in order to assist in the subsequent filtering operations. Such filter aids may comprise diatomaceous earths, clays, fuller's earths, sawdust, asbestos fibers, and the like.

Refined aromatic oils of the type described herein should preferably have the preponderant part boil above at least 250° C., and more particularly 275° C., in order to insure the production of synthetic rubber compositions having unusually desirable properties. Excellent results are obtained when aromatic oils of the type described the preponderant part of which boil above 300° C., more particularly above 325° C., and still more particularly above 340° C. are employed. These oils comprise mixtures of a large number of aromatic hydrocarbons.

In addition, such oils are preferred which have mixed aniline points below 15° C., and more particularly below 10° C., for example, between 10° C. and 4° C., and lower. A mixed aniline point of a given oil is defined as the critical solution temperature of a mixture of 10 cc. of anhydrous aniline, 5 cc. of the oil being tested, and 5 cc. of a petroleum naphtha having an aniline point of 60° C., as determined by A. S. T. M. tentative standard D611–41T.

Such refined oils also are preferred which contain at least 90%, such as, not less than 95%, and more particularly not less than 97%, of aromatic hydrocarbon content to insure complete compatibility with synthetic rubber.

Such refined oils are preferred which have densities of not less than 0.95 and, more particularly, not less than 0.98, for example, between 0.99 and 1.02, and higher, such as 1.11 or 1.12.

Furthermore such oils are preferred which have refractivity intercepts, as determined by the method described in The Science of Petroleum (1938) volume 2, beginning on page 1175, of not less than 1.08, for example, between 1.09 and 1.11, and higher, such as 1.125 or 1.135.

These values define preferred characteristics for refined aromatic oils of the type described herein for the preparation of synthetic rubber compositions.

Excellent results have been obtained employing refined high-boiling aromatic oil produced under such conditions of petroleum oil pyrolysis and under such conditions of separation from the resulting petroleum oil gas tar, that the material boiling above 210° C., when and as separated from the pitch constituents of the tar, contained at least 5%, and preferably at least 10% and still more preferably 20% or higher of heat polymerizable unsaturates.

As pointed out previously, high-boiling aromatic oils of the type described which have been found to be particularly adapted for use as a softener and/or plasticizing agent for synthetic rubber compounds and/or compositions may be isolated from the tar or tar emulsion obtained as a result of the pyrolytic decomposition of petroleum, or a fraction thereof, by the flash distillation or more preferably the solvent extraction of the tar or tar emulsion. The extract obtained may be separated into a high-boiling and a low boiling fraction, if desired, after which the high-boiling fraction, or the overall extract, may be subjected to polymerization to remove the unsaturated materials present. The oil obtained then is subjected to refining operations of the type described.

The oil obtained from the polymerizing operation also may be treated with clay or other surface active agent, either before or after separation from the polymers, followed by filtration and/or distillation, if desired. Successive clay treatments may be employed.

The oil may be refined by the method more particularly described herein either before or after such treating operation or operations.

The invention in its broad aspect, therefore, includes the employment of a high-boiling aromatic oil of petroleum tar origin of the type described, the said oil being refined by the removal of at least a portion of the crystalline, waxy, and/or solid materials present, and the use of such refined oil as an ingredient in synthetic rubber compositions. Such oils will be referred to herein as refined high boiling aromatic oils.

Examples of the synthetic rubber materials with which refined aromatic oils of the type described herein may be compounded are the various grades and types of synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefins, unsaturated nitriles, acids, esters, ethers, ketones, aldehydes, and /or substituents thereof, such as, for example, styrene acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as for example, Buna, Buna S, Buna N, Perbunan, Chloroprene, Neoprene, Ameripol, Hycar, Butyl rubber, and the like.

Synthetic rubbers of the type obtained by the reaction of dihalides with organic or inorganic sulfides or polysulfides also are included, such as, for example, the material prepared by the reaction of ethylene dichloride with sodium tetrasulfide and sold under the trade name, Thiokol.

The quantity of refined aromatic oils of the type described herein which may be incorporated in synthetic rubbers, or elastomers, may be varied over very wide limits, depending upon the properties desired. Thus, for example, quantities varying from a few per cent, or less, to an amount equal to, or greater than, the quantity of rubber, or rubber mixture, employed in the composition, may be used. I prefer to employ from 2% to 30% aromatic oil by weight and more particularly from 5% to 10% aromatic oil by weight of the rubber.

In addition to refined aromatic oils of the type described herein, other ingredients which may be incorporated in synthetic rubber compositions include vulcanizing agents and/or accelerators, such as for example, sulfur or sulfur-containing compounds such as tetramethyl-thiuram disulfide, mercapto-arylenethiazoles, such as mercaptobenzothiazole, benzothiazyl disulfide, litharge, and dithio carbamates; pigments, such as for example, magnesium oxide, zinc oxide, and lead oxide; antioxidants, such as for example, phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutyl phthalate, tricresyl phosphate, pine oil, oils, fatty acids, and synthetic or natural resins or resinous materials.

A preferred embodiment of this invention is the use of a refined aromatic oil of the type described in combination with one or more resinous materials as a softener for synthetic rubber compositions. A preferred resin for incorporating with the refined aromatic oil is the resin described herein as obtained by the polymerization, by thermal and/or catalytic methods, of certain high boiling monomeric material separated in monomeric form from tar formed during the production of combustible gas by processes involving the pyrolytic decomposition of petroleum oil with or without the aid of catalysts.

Another desired resin which may be incorporated in the refined aromatic high-boiling oil as a softener for synthetic rubber is the resin derived by the polymerization of petroleum and/or coal tar fractions containing indene and/or coumarone.

Other desirable ingredients which may be blended with a refined aromatic oil of the type described either alone or in combination with one or more resinous materials as a softener for synthetic rubber include the dimers of petroleum or coal tar fractions containing indene and/or coumarone, dibutyl phthalate, tricresyl phosphate, and pine oil.

Reclaimed synthetic rubber is also included among the materials which may be plasticized with the refined aromatic oils herein described, together with synthetic rubber and with or without other ingredients.

Natural rubber of various types and forms may be added to the mixtures of synthetic rubber and refined aromatic oil, with or without the presence of other ingredients such, for example, as are described herein.

The refined aromatic oil, and other ingredients, may be mixed or compounded with the synthetic rubber on mixing, compounding, and/or calendering rolls, or they may be compounded by any other method known in the art. The rubber compositon then may be vulcanized, if desired, by any of the methods employed for this purpose in the art.

Examples of synthetic rubber compositions are as follows:

Example 4

A synthetic rubber tire tread mix may be compounded as follows:

| Component | Parts by weight |
|---|---|
| Neoprene | 100 |
| Zinc oxide | 5 |
| Mercaptobenzothiazole | 1.25 |
| Channel black | 50 |
| Refined aromatic oil of the type described and boiling above 300° C | 5 |
| Phenyl-alpha-naphthylamine | 2 |
| Sulfur | 1.25 |

Example 5

| Component | Parts by weight |
|---|---|
| Butadiene-styrene rubber | 100 |
| Refined aromatic oil of the type described and boiling above 300° C | 2.5 |
| Resin obtained from monomeric material boiling above 210° C. and isolated from petroleum tar | 2.5 |
| Carbon black | 35 |
| Sulfur | 1.25 |
| Mercaptobenzothiazole | 1.25 |
| Zinc oxide | 5 |
| Phenyl-alpha-naphthylamine | 1 |

Example 6

| Component | Parts by weight |
|---|---|
| Butadiene-acrylic nitrile rubber | 100 |
| Refined aromatic oil of the type described and boiling above 300° C | 3 |
| Resin obtained from monomeric material boiling above 210° C. and isolated from petroleum tar | 3 |
| Carbon black | 25 |
| Sulfur | 1.5 |
| Mercaptobenzothiazole | 1.5 |
| Zinc oxide | 20 |
| Phenyl-alpha-naphthylamine | 2 |

Example 7

| Component | Parts by weight |
|---|---|
| Butadiene-isobutylene rubber | 100 |
| Refined aromatic oil of the type described and boiling above 300° C | 5 |
| Resin obtained from monomeric material boiling above 210° C. and isolated from petroleum tar | 5 |
| Carbon black | 20 |
| Sulfur | 1.25 |
| Mercaptobenzothiazole | 1.25 |
| Phenyl-alpha-naphthylamine | 1 |
| Zinc oxide | 15 |

The outstanding properties of my refined aromatic oil are cogently demonstrated when it is used as a plasticizer or softener, for a product known commercially as Hycar O. R. which is thought to be a butadiene acrylic nitrile rubber. My refined aromatic oil as compared to a somewhat similar oil derived from coal tar has a greatly enhanced solvent power for the rubber; imparts a considerably greater tack to the rubber; a higher modulus; a higher tensile strength; a very much lower low temperature flexibility; and incorporates with the rubber at a higher rate.

The relatively high solvent power of my refined aromatic oil and the relative ease with which it is incorporated with the rubber not only reduces the incorporating time but also the working pressures or mechanical effort ordinarily required for the incorporatiton of plasticizers or softeners.

In other words, it is not necessary to unduly break-down the rubber by working it at high pressures on rubber rolls in order to incorporate my aromatic oil. This reflects itself not only in a considerable saving of time but also in mechanical effort and makes available for incorporation purposes other types of industrial apparatus other than rubber rolls, for example, Banberry mixers.

The foregoing applies generally to other types of synthetic rubber such as, for example, butadiene-styrene rubber.

The foregoing compositions may be sheeted out, shaped and vulcanized, if desired, such as by the application of a temperature of say 140° C. in a press for a period of say 45 minutes. Other procedures may, of course, be used if desired.

Synthetic rubber refined aromatic oil compositions of the type described, either as such or with the incorporation of other ingredients such as the resin derived from monomeric material boiling above 210° C. and isolated from petroleum tar, and with or without the addition of natural rubber, may be used for a variety of purposes, such as for the manufacture of tires, tubes, and other objects, and as adhesives, coating, impregnating, waterproofing agents. Such compositions may or may not be vulcanized prior to, during, or subsequent to the use thereof.

The term "rubber" as used herein is intended to define a material which does not possess a definite and reproducible softening point, and which is capable of being vulcanized.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

I prefer the following definition.

"The term rubber is intended to embrace elastomers, whether natural or synthetic, and whether or not admixed with other ingredients such as pigments, softening agents, etc., in the vulcanized or unvulcanized state, the said elastomer being (1) capable of vulcanization such as by the application of heat when in admixture with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly."

While various procedures and formulae have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention.

I claim:

1. As a new composition of matter, a hydrocarbon oil which has been physically separated from tar produced in the vapor phase pyrolysis at average temperatures above 1300° F. of petroleum oil and which hydrocarbon oil boils between 225° C. and 450° C. but is free from and of greater volatility than the pitch of said tar, said hydrocarbon oil having an aromatic hydrocarbon content of at least 90%, being substantially free from solid bodies at 10° C. and also being substantially free from resin-forming material.

2. As a new composition of matter, a hydrocarbon oil which has been physically separated from tar produced in the vapor phase pyrolysis at average temperatures above 1300° F. of petroleum oil and which hydrocarbon oil boils between 225° C. and 450° C. but is free from and of greater volatility than the pitch of said tar, said hydrocarbon oil having an aromatic hydrocarbon content of at least 95%, having a refractivity intercept of at least 1.11, being substantially free of crystalline material at 0° C., and being substantially free from resin-forming material polymerizable by the application of heat alone.

3. As a new composition of matter, a hydrocarbon oil which has been physically separated from tar produced in the vapor phase pyrolysis at average temperatures above 1300° F. of naphthenic petroleum oil and which hydrocarbon oil boils between 300° C. and 450° C. but is free from and of greater volatility than the pitch of said tar, said hydrocarbon oil having an aromatic hydrocarbon content of at least 97%, having a crystallizing point below −30° C. and being substantially free from resin-forming material polymerizable by the application of heat alone.

4. As a new composition of matter, a hydrocarbon oil which has been physically separated from tar emulsion produced in the vapor phase pyrolysis at average temperatures above 1300° F. of petroleum oil and which hydrocarbon oil boils between 300° C. and 450° C. and is free from and of greater volatility than the pitch of said tar, said hydrocarbon oil having an aromatic hydrocarbon content of at least 95%, being substantially free of solid bodies at −40° C., and being substantially free from resin-forming material polymerizable by the application of heat alone.

5. As a new composition of matter, a hydrocarbon oil which has been physically separated from tar produced in the vapor phase pyrolysis at average temperatures above 1300° F. of petroleum oil and which hydrocarbon oil boils between 300° C. and 450° C. and is free from and of greater volatility than the pitch of said tar, said hydrocarbon oil having an aromatic hydrocarbon content of at least 95%, having a refractivity intercept of at least 1.11, having a crystallizing point below 0° C., and being substantially free from resin-forming material polymerizable by means of sulfuric acid.

6. As a new composition of matter, a hydrocarbon oil which has been separated by solvent extraction from tar produced in the vapor phase pyrolysis at average temperatures above 1300° F. of naphthenic petroleum oil and which hydrocarbon oil boils between 225° C. and 450° C. but is free from and of greater volatility than the pitch of said tar, said hydrocarbon oil having an aromatic hydrocarbon content of at least 97%, having a refractivity intercept of at least 1.125, being substantially free from solid bodies at 10° C. and also being substantially free from resin-forming material.

7. As a new composition of matter, a hydrocarbon oil which has been separated by rapid distillation from tar produced in the vapor phase pyrolysis at average temperatures above 1300° F. of naphthenic petroleum oil and which hydrocarbon oil boils between 225° C. and 450° C. but is free from and of greater volatility than the pitch of said tar, said hydrocarbon oil having an aromatic hydrocarbon content of at least 97%, having a refractivity intercept of at least 1.125, being substantially free from solid bodies at 10° C. and also being substantially free from resin-forming material.

FRANK J. SODAY.

REFERENCES CITED

The following references are of record in the file of this patent:

UNITED STATES PATENTS

| Number | Name | Date |
| --- | --- | --- |
| 2,220,531 | Lazar | Nov. 5, 1940 |
| 2,319,634 | Sauser | May 18, 1943 |
| 1,924,281 | Jagschitz | Aug. 29, 1933 |
| 1,985,860 | Gruse | Dec 25, 1934 |
| 2,150,641 | Thomas, et al. | Mar. 14, 1939 |
| 2,363,241 | Harvey, et al. | Nov. 21, 1944 |
| 1,483,835 | Ramage | Feb. 12, 1924 |
| 1,441,341 | Govers | Jan. 9, 1923 |

FOREIGN PATENTS

| Number | Country | Date |
| --- | --- | --- |
| 459,189 | British | Jan. 4, 1937 |